(12) United States Patent
Coskun et al.

(10) Patent No.: US 7,583,958 B2
(45) Date of Patent: Sep. 1, 2009

(54) INTEGRATED MESSAGE DELIVERY OVER A PLURALITY OF TRANSPORT MEDIUMS

(75) Inventors: Risvan Coskun, Ottawa (CA); Haining Zhang, Kanata (CA)

(73) Assignee: Research In Motion Limited, Waterloo (CA)

( * ) Notice: Subject to any disclaimer, the term of this patent is extended or adjusted under 35 U.S.C. 154(b) by 666 days.

(21) Appl. No.: 10/982,480

(22) Filed: Nov. 5, 2004

(65) Prior Publication Data
US 2006/0099976 A1 May 11, 2006

(51) Int. Cl.
H04M 11/10 (2006.01)
(52) U.S. Cl. ............. 455/414.4; 455/414.3; 455/412.1; 455/466; 455/412.2; 455/415; 455/456.1; 358/1.15
(58) Field of Classification Search ............... 455/415, 455/412.1, 412.2, 466, 414.1
See application file for complete search history.

(56) References Cited

U.S. PATENT DOCUMENTS 6,882,843 B1 * 4/2005 Comer .................. 455/445
7,171,190 B2 * 1/2007 Ye et al. ................. 455/412.1
7,277,719 B2 * 10/2007 Klassen et al. ............. 455/466
2003/0105823 A1 6/2003 Ally et al.
2007/0236727 A1 * 10/2007 Proust et al. ............... 358/1.15

FOREIGN PATENT DOCUMENTS

| DE | 205 224 | 12/1983 |
| GB | 2 161 872 A | 1/1986 |
| GB | 2 398 969 A | 9/2004 |
| JP | 56-164228 | 12/1981 |
| WO | WO 03/096559 A1 | 11/2003 |
| WO | WO 2004/057888 A1 | 7/2004 |

* cited by examiner

Primary Examiner—Charles N Appiah
Assistant Examiner—Randy Peaches
(74) Attorney, Agent, or Firm—Jones Day; Krishna K. Pathiyal; Robert C. Liang (57) ABSTRACT

Facilitating a communication directed to a communication device operable to receive data over a plurality of transport mediums includes determining present transport coverage of the communication device, determining which transport mediums the communication device is presently operable to receive the communication, and selecting one of theses transport mediums for delivery of the communication to the communication device.

26 Claims, 9 Drawing Sheets

INTEGRATED MESSAGE DELIVERY OVER A PLURALITY OF TRANSPORT MEDIUMS

This disclosure relates in general to voice and data communication systems, and in particular relates to systems and methods for managing communications over a plurality of communication mediums.

A communication device, such as mobile communication device, may be operable to receive communications over a plurality of transport mediums. These transport mediums may include short message service (SMS) mediums, e-mail mediums, peer-to-peer device mediums, and the like. The availability of a particular transport medium at a particular time depends on the transport coverage of the mobile device. For example, a mobile device may be in a service area that supports SMS messaging but does not support e-mail messaging. Thus, if an e-mail is sent to the mobile device, the mobile device may not receive the e-mail until it is within a transport coverage that supports e-mail messaging.

Disclosed herein are systems and methods for providing an integrated transport medium delivery of a communication to a communication device. A communication to be delivered to a communication device over a transport medium over which the communication device is not presently operable to receive data may be delivered to the communication device over one or more additional transport mediums over which the communication device is presently operable to receive data.

DETAILED DESCRIPTION

Figure 1:
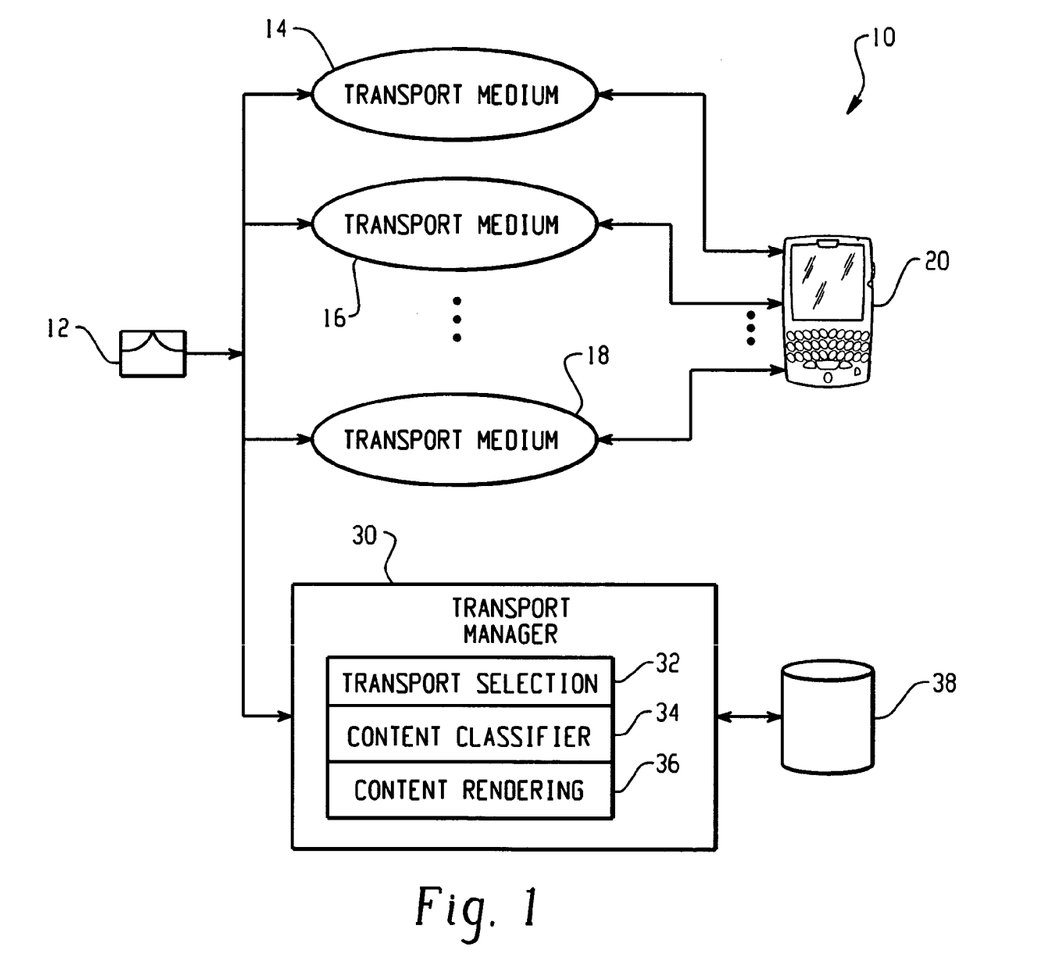
FIG. 1 is a block diagram of an integrated message delivery system.

FIG. 1 is a block diagram of an integrated message delivery system 10. In this system 10, a communication 12 may be transmitted over one or more transport mediums 14, 16, and 18 to a mobile communication device 20. The mobile device 20 may receive the communication 12 or a subset thereof over any one of the transport mediums 14, 16 and 18.

The transport mediums may include an e-mail transport medium 14, a PIN transport medium 16 (e.g., a transport medium for communications addressed by a SIM PIN associated with a user of a mobile device or a unique identifier associated with a mobile device), and a SMS transport medium 18. Additional transport mediums may also be included, depending on the communication capabilities of the mobile device 20.

At any given time, the mobile device 20 may not be presently operable to receive data over one or more of the transport mediums 14, 16 and 18. For example, the mobile device 20 may be out of data coverage for the transport medium 14, but may be in data coverage for the transport mediums 16 and 18. Thus, the mobile device 20 may be presently operable to receive PIN and SMS communications, but not presently operable to receive e-mail communications.

The communication 12 is typically associated with a first transport medium, e.g., an e-mail communication is associated with the e-mail transport medium 14, a PIN communication is associated with the PIN transport medium 16, and a SMS communication is associated with the SMS transport medium 18. If the mobile device 20 is out of data coverage for a particular transport medium, or if a network associated with the particular transport medium is down, then the mobile device 20 cannot presently receive a communication over that particular transport medium. Furthermore, if the communication 12, or a subset of the communication 12, cannot be delivered over one of the remaining transport mediums over which the communication device 20 is presently operable to receive data, then the communication 12 may not be delivered to the mobile device 20 in a timely manner, or may not be delivered at all.

A transport manager 30 facilitates the delivery of the communication 12, or a subset of the communication 12, over the plurality of transport mediums 14, 16 and 18. The transport manager 30 may comprise program code including program instructions executable by a processing device, and may be implemented in a system that is operable to monitor or receive data related to one or more communications facilitated by the transport mediums 14, 16 and 18. For example, the transport manager 30 may be implemented in a remote computing device, such as wireless network gateway, that is operable to receive the communications directed to the mobile device 20 or receive data indicative of communications directed to the mobile device 20.

The transport manager 30 may be operable to determine if the mobile device 20 is presently operable to receive the communication 12 over the first transport medium. If the mobile device 20 is operable to do so, then the communication 12 is transmitted to mobile device 20 over the first transport medium. However, if the mobile device 20 is not operable to presently receive the communication 12 over the first transport medium, then the transport manager 30 determines over which of the transport mediums 14, 16 and 18 the communication device 20 is presently operable to receive data, and selects one of the plurality of transport mediums 14, 16 and 18 as a second transport medium for delivery of at least a subset of the communication 12 to the mobile device 20.

The determination of whether the mobile device 20 is presently operable to receive data over a transport medium may be made by determining if the mobile device 20 has secured a network resource for the transport medium, or whether a timeout for a message delivery over the transport medium has occurred, or if data received from the mobile device 20 includes indicia of mobile device 20 coverage. Other methods of determining whether the mobile device 20 is presently operable to receive data over a transport medium may also be used.

In one embodiment, only a subset of the communication is delivered to the communication device, depending on which transport medium is selected as a second transport medium for delivery. For example, if an e-mail communication cannot be delivered over the e-mail transport medium 14, then a subset of the e-mail communication may be delivered over the SMS transport medium 18. This embodiment facilitates delivery of at least a portion of the communication over a second transport medium when the second transport medium may facilitate communications of a limited bandwidth or size.

In one embodiment, the transport manager 30 comprises a transport selection function block 32, a content classifier function block 34, and a content rendering function block 36. Each function block 32, 34 and 36 may be realized by program code comprising program instructions executable by a processing device. The transport selection function block 32 selects one or more transport mediums 14, 16 and 18 for delivery of the communication 12. For example, if the e-mail transport medium 14 is not available, the transport selection function block 32 may select the SMS transport medium 18 as a second transport medium.

The content classifier function block 34 identifies the communication type and size of the communication (e.g., e-mail message and size, PIN message and size, SMS message and size, etc.). The content rendering function block 36 determines whether rendering of the communication 12 is necessary to deliver at least a portion of the communication over an alternate transport medium, and performs such rendering if necessary. For example, the content rendering function block 36 may render a subset of an e-mail message, such as the address of the sender and the subject line, as a SMS message to be delivered over the SMS transport medium 18.

In another embodiment, the transport manager 30 may be further operable to access transport data 38 to determine which of the transport mediums is to be selected as the second transport medium. For example, a user of the mobile device 20 may specify in the transport data 38 that only e-mail messages are to be delivered over alternate transport mediums, and that PIN and SMS messages are not to be delivered over alternate transport mediums.

Furthermore, the transport data 38 may also store user preferences for the selection of alternate transport mediums. For example, the user of the mobile device 20 may specify in the transport data 38 that the e-mail messages are to be directed over the PIN transport medium 16 if the PIN transport medium 16 is available, and, if the PIN transport medium 16 is not available, then the e-mail messages or portions of the e-mail messages are to be directed over the SMS transport medium 18.

The transport data 38 may also comprise contact data corresponding to the plurality of transport mediums 14, 16 and 18. In one embodiment, the contact data comprises e-mail addresses, unique identifier numbers associated with a mobile communication device or users (e.g., a SIM PIN associated with a user of a mobile device or a unique identifier associated with a mobile device), and SMS numbers. Other contact data corresponding to other transport mediums may also be stored. In one embodiment, the transport data 38 may be stored in a remote computer device that is operable to communicate with the transport manager 40.

Figure 2:
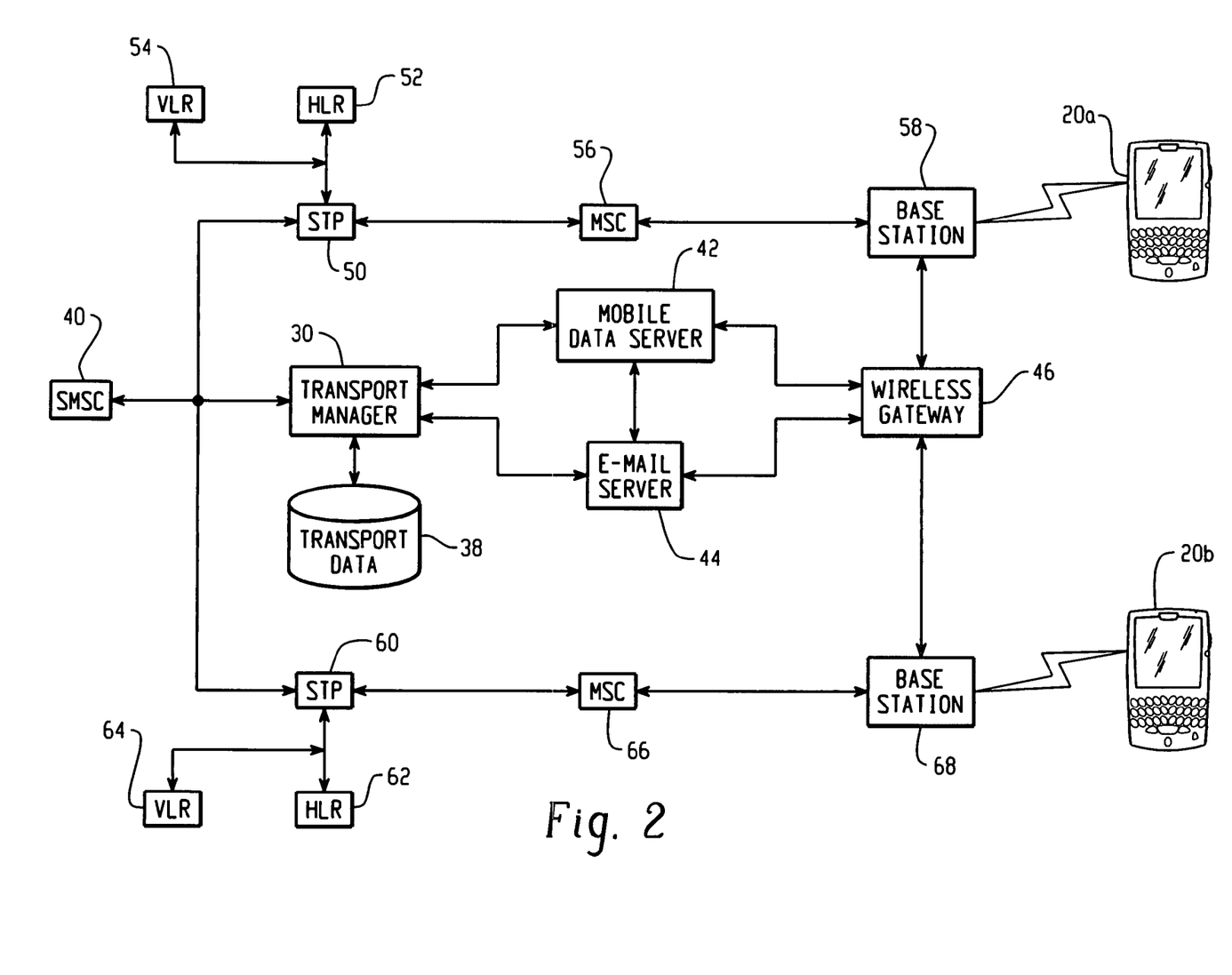
FIG. 2 is an example operating environment for the systems and methods described herein.

FIG. 2 is an example operating environment for the systems and methods described herein. As shown in FIG. 2, the transport manager 30 may be configured to facilitate the delivery of a communication to mobile devices 20a and 20b over a plurality of transport mediums. These transport mediums may be realized by a wide area network (WAN), such as the Internet, in communication with one or more wireless base stations. Additionally, the transport mediums may be further realized by IS-41 interconnections over a signaling system 7 (SS7) intelligent network, for example.

A first transport medium supported in FIG. 2 is a SMS transport medium. The transport manager 30 is in data communication with a short messaging service center (SMSC) 40. The SMSC 40 supports the transfer of text messages between mobile devices 20a and 20b. Each of the mobile devices 20a and 20b may be operable to send and receive SMS messages.

A second transport medium supported in FIG. 2 is a PIN messaging transport medium. The transport manager 30 is in data communication with a mobile data server 42. The mobile data server 42 supports the transfer of PIN messages between the mobile devices 20a and 20b.

A third transport medium supported in FIG. 2 is an e-mail transport medium. The transport manager 30 is in data communication with an e-mail server 44. The e-mail server 44 supports the deliver of e-mail messages to the mobile devices 20a and 20b.

The transport manager 30 is also in data communication with a signal transfer point (STP) 50. The STP 50 is a multiport high speed packet switch that routes each incoming message to an outgoing signaling link based on routing information included in the message. The STP 50 is in data communication with a home location register (HLR) database 52 and a visitor location register (VLR) database 54. The HLR 52 includes a database of network subscribers. Upon interrogation by the SMSC 40, the HLR 52 provides routing information for a particular mobile device.

The VLR 54 comprises a database that includes information about network subscribers of a particular HLR that are roaming in another HLR. The VLR 54 thus keeps track of where the mobile devices roaming within its area are currently located.

A mobile switching center (MSC) 56 performs the switching functions for a mobile communication system and routes calls from other telephone and data systems over a mobile network. The MSC 54 may comprise, for example, a telephone switch, similar to a central office switch, that bridges a mobile telephone network with another telephone network such as the PSTN.

The base station 58 is in data communication with the MSC 56 and the wireless gateway 46 and provides a radio frequency link to the mobile device 20a. The base station 58 may comprise, for example, a cellular transmitter/receiver that maintains communications with the mobile device 20a within a given range.

The STP 60, HLR 62, VLR 64, MSC 66, and base station 68 are similar or the same as the STP 50, HLR 52, VLR 54, MSC 56, and base station 58. For example, the STP 60, HLR 62, VLR 64, MSC 66, and base station 68 may comprise a portion of a communication network of a cellular provider. The STP 60, HLR 62, VLR 64, MSC 66, and base station 68 may facilitate one or more communication systems, such as the Mobitex™ mobile communication system, the DataTAC™ mobile communication system, a GSM network, a GPRS network, a UMTS network, and/or an EDGE network.

The transport manager 30 is operable to facilitate the delivery of a communication over the e-mail, PIN and SMS transport mediums. The transport manager 30 receives communication data for a communication to be delivered to a mobile device 20 over a first transport medium. For example, the transport manager 30 may receive e-mail communication data for an e-mail communication to be delivered over an e-mail transport medium. The communication data received by the transport manager 30 may comprise the entire e-mail communication, or may alternatively comprise indicia regarding the e-mail communication on the e-mail server 44. The indicia may comprise routing information, message size, or other indicia sufficient to indicate the type of communication and to which mobile device 20 the communication is to be delivered.

The transport manager 30 determines if the mobile device 20 is presently operable to receive the communication over the first transport medium. If so, then no further action is required, as the communication will be delivered over the first transport medium. The determination may be made by determining if the mobile device 20 has secured a network resource for the first transport medium, or whether a timeout for a message delivery over the transport medium has occurred, or if data received from the mobile device 20 includes indicia of mobile device 20 coverage. Other methods of determining whether the mobile device 20 is presently operable to receive data over a transport medium may also be used.

If the transport manager 30 determines that the mobile device 20 is not presently operable to receive the communication over the first transport medium, then the transport manager 30 determines over which of the plurality of transport mediums the mobile device 20 is presently operable to receive the communication. For example, if the mobile device 20 is not presently operable to receive the e-mail message over the e-mail transport medium, then the transport manager 30 determines if the mobile device 20 is operable to receive data over the PIN transport medium or the SMS transport medium. The determination may be made by determining if the mobile device 20 has secured a network resource for these other transport mediums, by "pinging" or requesting a data packet from the mobile device over the other transport mediums, or if data received from the mobile device 20 includes indicia of mobile device 20 coverage over these other transport mediums. Other methods of determining whether the mobile device 20 is presently operable to receive data over these other transport medium may also be used. In one embodiment, the transport selection function block 32 determines and selects which of the plurality of transport mediums the mobile device 20 is presently operable to receive the communication.

In another embodiment, the transport manager 30 may be further operable to access transport data 38 to determine which of the transport mediums is to be selected as the second transport medium. For example, a user of the mobile device 20 may specify in the transport data 38 that only e-mail messages are to be delivered over alternate transport mediums, and that PIN and SMS messages are not to be delivered over alternate transport mediums. Furthermore, the transport data 38 may also store user preferences for the selection of alternate transport mediums. For example, the user of the mobile device 20 may specify in the transport data 38 that the e-mail messages are to be directed over the PIN transport medium if the PIN transport medium is available, and, if the PIN transport medium is not available, then the e-mail messages or portions of the e-mail messages are to be directed over the SMS transport medium.

If the mobile device 20 is operable to receive data over one or more of the other transport mediums, then the transport manager 30 selects one of the transport mediums as a second transport medium for delivery of at least a subset of the communication to the communication device. A subset of the communication will be delivered over the second transport medium, or the entire communication will be delivered over the second transport medium, depending on the type of communication and the data capabilities of the second transport medium. For example, if the communication is an e-mail message, and the second transport medium selected is a PIN transport medium, then the entire e-mail message may be delivered over the PIN transport medium.

Conversely, if the second transport medium selected is an SMS transport medium, then a subset of the e-mail message may be delivered over the SMS transport medium. The subset may be selected by converting the communication from the first transport medium format (e.g., the e-mail format) to a second transport medium format (e.g., the SMS format) that corresponds to the second transport medium. For example, in GSM environments, an SMS message can contain up to 140 bytes of data. Thus, a subset of the e-mail message, such as the address of the sender and the subject line, may be rendered into an SMS message. In one embodiment, a content classifier function block 34 determines the message content and content type, and content rendering function block 36 converts the communication from the first transport medium format to the second transport medium format, if required.

In one embodiment, the transport manager 30 may be further configured to terminate delivery of the communication over the first transport medium if the communication, or a subset of the communication, is delivered over the second transport medium. Alternatively, the communication may be stored and later delivered over the first transport medium when the mobile device becomes presently operable to receive the data over the first transport medium. In this latter embodiment, the user of the mobile device 20 thus receives the communication or subset of the communication in a timely manner, and will also receive the communication over the first transport medium when the mobile device becomes presently operable to receive data over the first transport medium.

Other message types may also be delivered over other transport mediums. For example, a PIN message may be delivered over the e-mail transport medium or the SMS transport medium, and an SMS message may be delivered over the e-mail transport medium or the PIN transport medium. Additionally, while only e-mail, PIN and SMS transport mediums are shown in this example, other transport mediums may also be used to facilitate delivery of communications or subsets of the communications to mobile devices 20.

Figure 3:
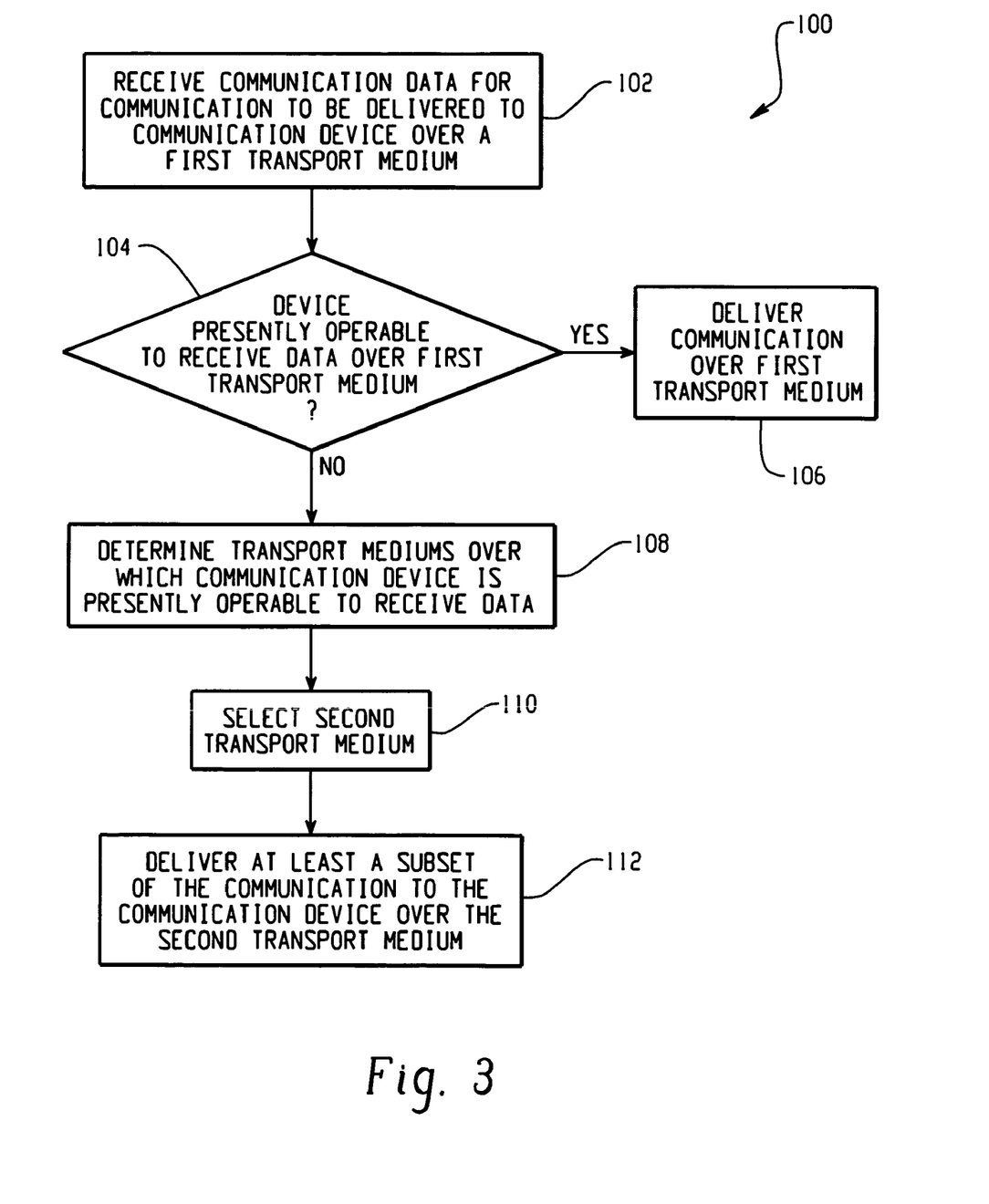
FIG. 3 is a flow diagram for an example process of facilitating a communication over a plurality of transport mediums.

FIG. 3 is a flow diagram 100 for an example process of facilitating a communication over a plurality of transport mediums. In step 102, a transport manager 30 receives communication data for a communication to be delivered to a communication device over a first transport medium. In step 104, the transport manager 30 determines if the communication device is presently operable to receive data over the first transport medium. If the communication device is presently operable to receive data over the first transport medium, then in step 106 the communication is delivered to the communication device over the first transport medium.

If the transport manager 30 determines that the communication device is not presently operable to receive data over the first transport medium, however, then in step 108 transport manager 30 determines which transport mediums the communication device is presently operable to receive data. In step 110, the transport manager selects a second transport medium. The second transport medium is selected from one of the transport mediums determined in step 108. In step 112, the transport manager 30 delivers at least a subset of the communication to the communication device over the second transport medium.

Figure 4:
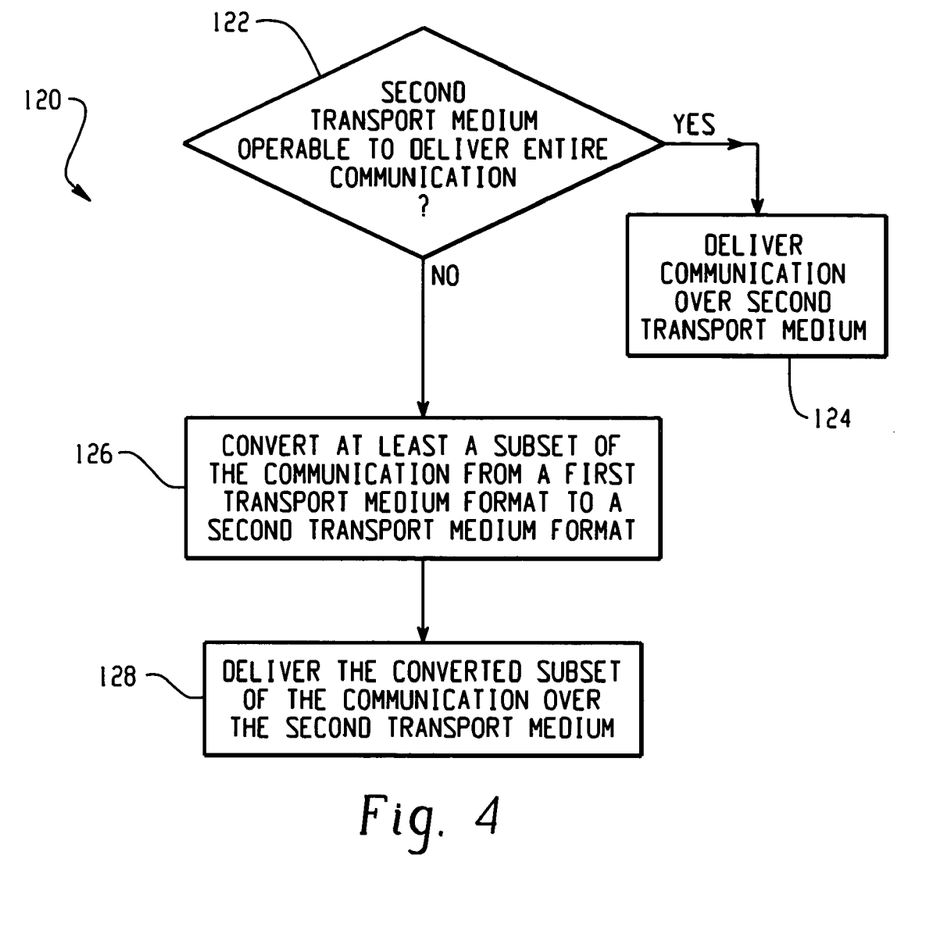
FIG. 4 is flow diagram for an example process of delivering at least a subset of a communication over a second transport medium.

FIG. 4 is a flow diagram 120 for an example process of delivering at least a subset of a communication over a second transport medium. In step 122, the transport manager 30 determines if the second transport medium is operable to deliver the entire communication to the communication device. If the transport manager determines that the second transport medium is operable to deliver the entire communication to the communication device, then in step 124 the communication is delivered to the communication device over the second transport medium.

If the transport manager 30 determines that the second transport medium is not operable to deliver the entire communication to the communication device, however, then in step 126 the transport manager 30 converts at least a subset of the communication from a first transport medium format to a second transport medium format. In step 128, the converted subset of the communication is delivered to the communication device over the second transport medium.

Figure 5:
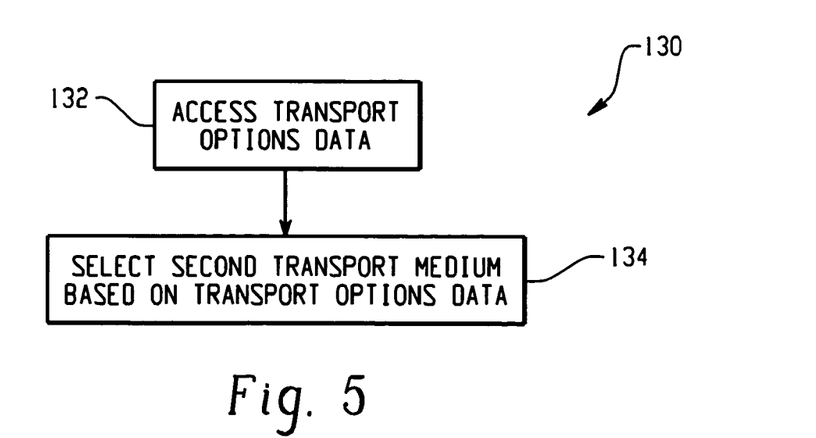
FIG. 5 is a flow diagram for an example process of selecting the second transport medium.

FIG. 5 is a flow diagram 130 for an example process of selecting the second transport medium. In step 132, the transport manager 30 accesses transport options data. The transport options data may store user preferences for delivery of messages over alternate transport mediums. In step 134, the transport manager selects a second transport medium based on the transport options data accessed in step 132.

Figure 6:
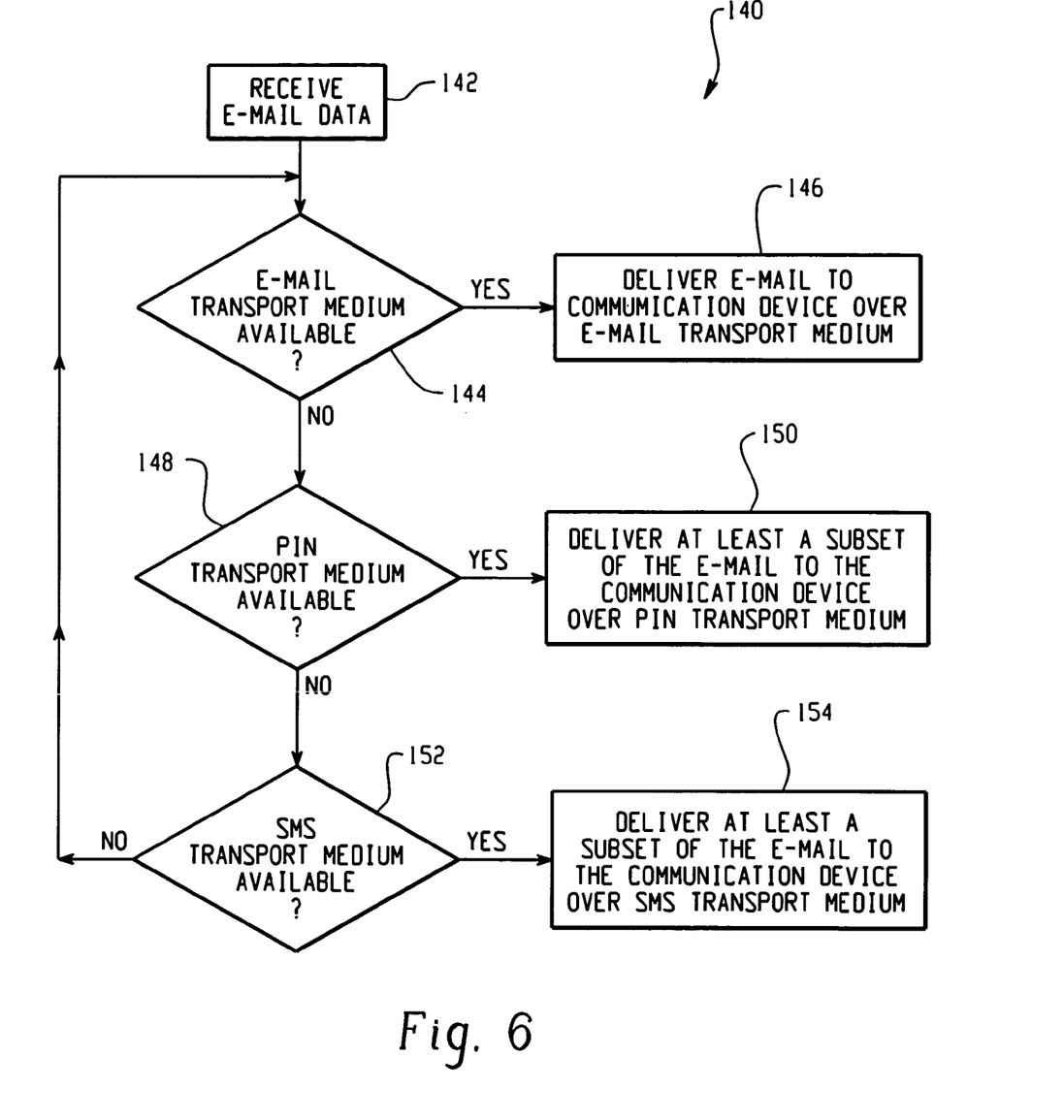
FIG. 6 is a flow diagram for an example process of facilitating a communication over either an e-mail, Personal Identification Number (PIN) or SMS transport medium.

FIG. 6 is a flow diagram 140 for an example process of facilitating a communication over either an e-mail, PIN or SMS transport medium. In step 142, the transport manager 30 receives e-mail data. The e-mail data may comprise the entire e-mail message, or may alternatively comprise indicia of the e-mail message. In step 144, the transport manager 30 determines if an e-mail transport medium is available. If the transport manager 30 determines that an e-mail transport medium is available, then in step 146 the e-mail is delivered to the communication device over the e-mail transport medium.

However, if the transport manager 30 determines that an e-mail transport medium is not available, then in step 148 the transport manager 30 determines if a PIN transport medium is available. If the transport manager 30 determines that a PIN transport medium is available, then in step 150 at least a subset of the e-mail communication is delivered to the communication device over the PIN transport medium.

However, if the transport manager 30 determines that the PIN transport medium is not available, then in step 152 the transport manager 30 determines if a SMS transport medium is available. If the transport manager 30 determines that a SMS transport medium is available, then in step 154 at least a subset of the e-mail is delivered to the communication device over the SMS transport medium. If the transport manager 30 determines that an SMS transport medium is not available, however, then the transport manager 30 returns to step 144 and begins execution of the process again.

Figure 7:
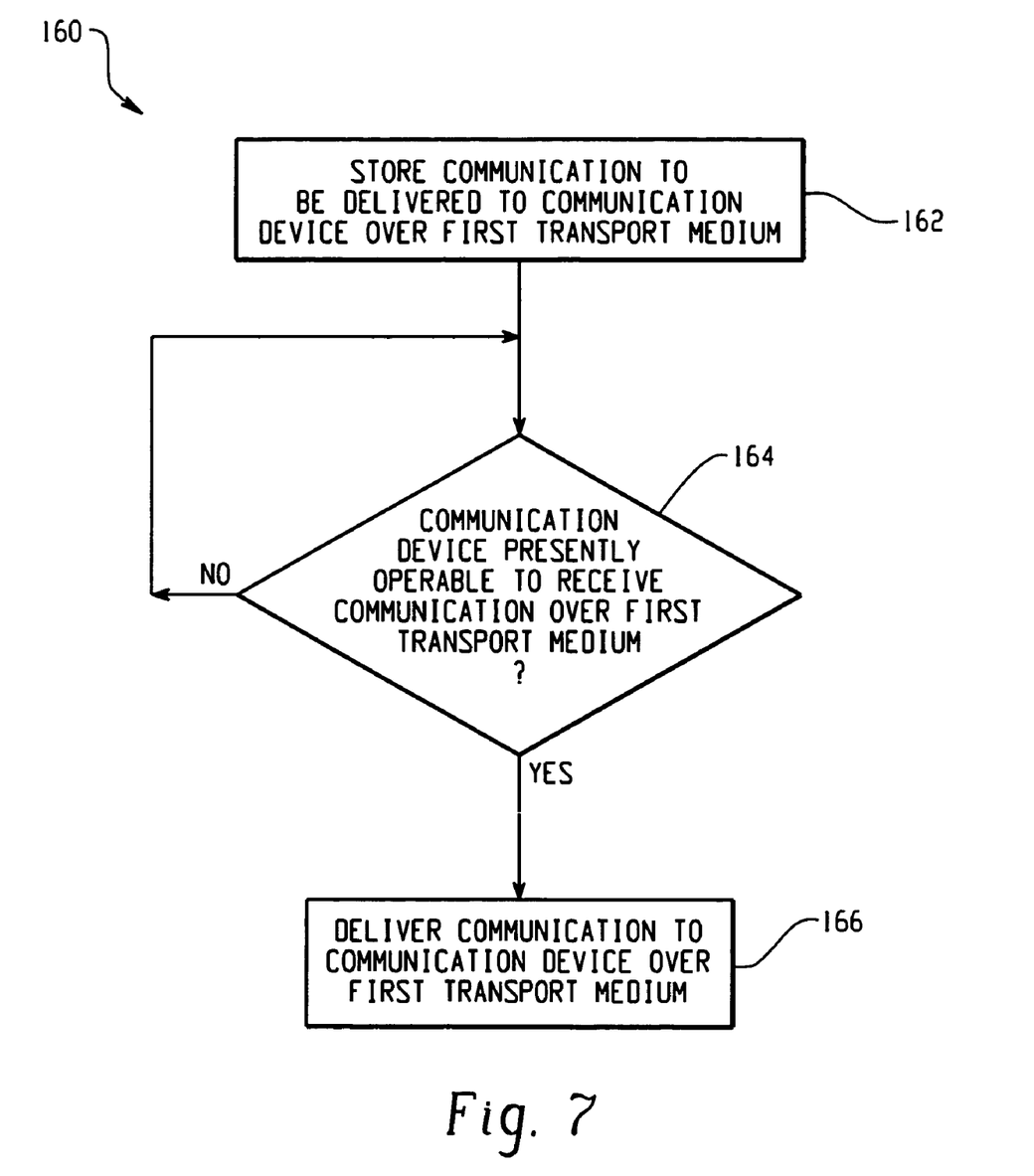
FIG. 7 is a flow diagram for an example process of storing and delivering a communication over a first transport medium.

FIG. 7 is a flow diagram 160 for an example process of storing and delivering a communication over a first transport medium. This process may be executed by the transport manager 30 after the communication has been delivered to the communication device. In step 162, the communication to be delivered to the communication device over the first transport medium is stored in a data store. The particular data store may depend upon the communication type. For example, if the communication is an e-mail communication, the data store may comprise an e-mail server.

In step 164, the transport manager 30 determines if the communication device is presently operable to receive communications over the first transport medium. If the communication device is operable to receive communications over the first transport medium, then in step 166 the communication is delivered to the communication device over the first transport medium. However, if the communication device is not presently operable to receive the communication over the first transport medium, then step 164 is executed again.

In one embodiment, the process of FIG. 7 is executed only if a subset of the communication is delivered to the communication device over a second transport medium. Accordingly, the mobile device will receive the original communication only if the entirety of the original communication is not delivered over the second transport medium. In an alternative embodiment, the process of FIG. 7 is executed regardless of whether the entire communication or a subset of the communication is delivered over the second transport medium.

Figure 8:
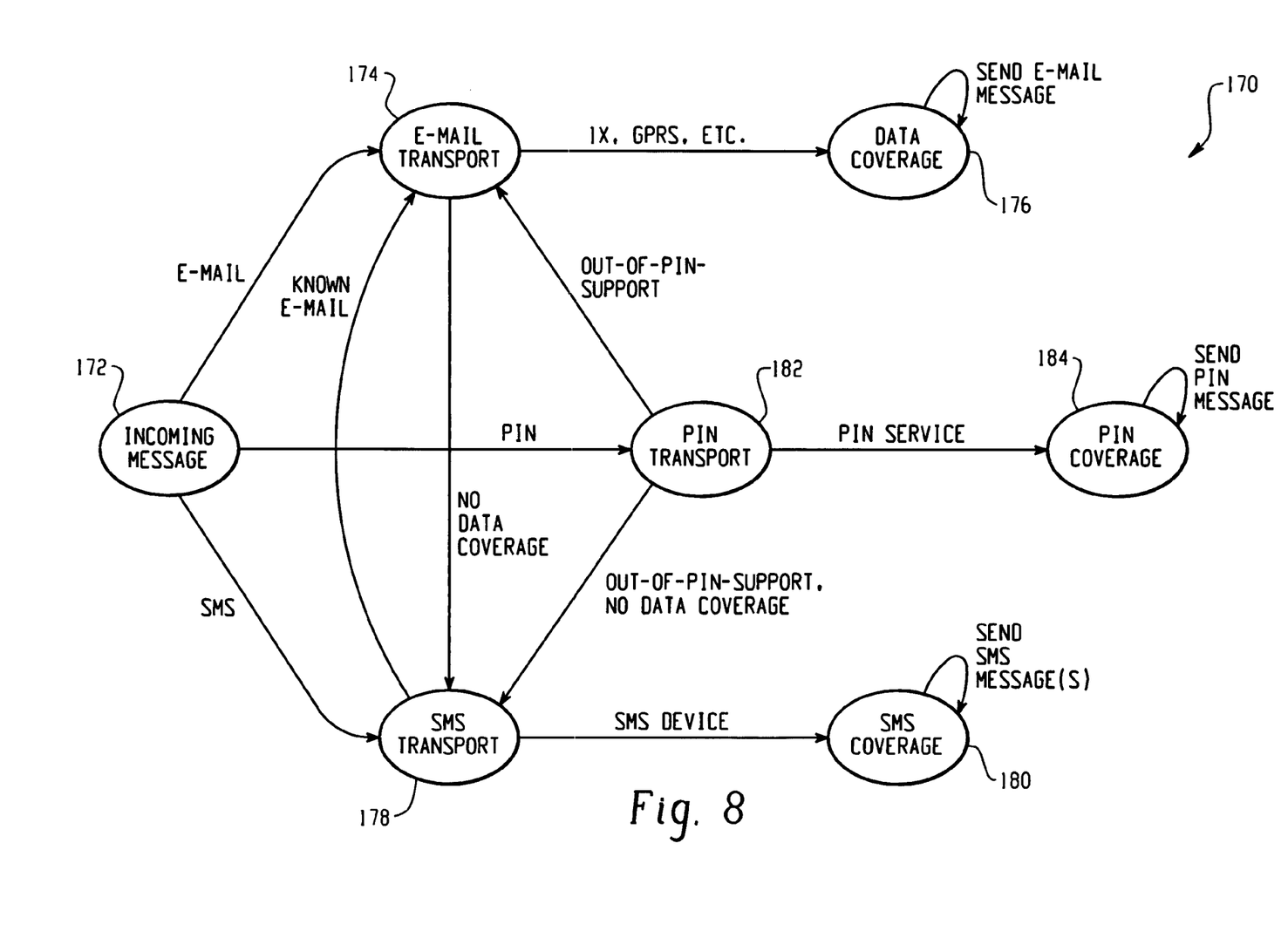
FIG. 8 is an example state diagram for an integrated message delivery system.

FIG. 8 is an example state diagram 170 for an integrated message delivery system. Incoming message state 172 monitors for communication to be delivered over a transport medium. Upon the event of receiving communication data for a communication to be delivered over a transport medium, a transition occurs to the e-mail transport state 174, the SMS transport state 178, or the PIN transport state 182.

If the communication is an e-mail communication, then transition to the e-mail transport state 174 occurs. If the mobile device has data coverage for e-mail, then transition to the data coverage state 176 occurs, and the e-mail message is sent to the mobile device over an e-mail transport medium. However, if data coverage is not available, then transition to the SMS transport state 178 occurs. Transition to SMS coverage state 180 then occurs, and the e-mail message or a subset of the e-mail message is delivered to the mobile device over a SMS transport medium.

If the incoming message is a PIN message, then transition to the PIN transport state 182 occurs. If PIN service is available to the mobile device, then transition to the PIN coverage state 184 occurs, and the PIN message is delivered to the mobile device over the PIN transport medium. However, if PIN service is not available to the mobile device, then transition to the e-mail transport state 174 occurs. If data coverage is available for the mobile device, then transition to the data coverage state 176 occurs, and the PIN message is delivered to the mobile device over the e-mail transport medium.

However, if both PIN service and e-mail service are not available to the mobile device, then transition to the SMS transport state 178 occurs. If SMS service is available to the mobile device, then transition to the SMS coverage state 180 occurs, and the PIN message or a subset of the PIN message is delivered to the mobile device over the SMS transport medium.

If the incoming message is an SMS message, then transition to the SMS transport state 178 occurs. If the mobile device is operable to receive SMS messages over the SMS transport medium, then transition to the SMS coverage state 180 occurs, and the SMS message is delivered to the mobile device. However, if the mobile device is not operable to receive SMS messages over the SMS transport medium, then transition to the e-mail transport state 174 occurs. If the mobile device is in data coverage, then transition to the data coverage state 176 occurs, and the SMS message is delivered over the e-mail transport medium.

The example state diagram 170 of FIG. 8 may be modified to change the transport medium selection and processing. For example, modification or changes to the user selections and preferences stored in the transport data 38 may result in modifications or changes to the resulting state diagram 170.

The steps and the order of the steps in the methods and flowcharts described herein may be altered, modified and/or augmented and still achieve the desired outcome. Additionally, the methods, flow diagrams and structure block diagrams described in this patent document may be implemented in the example processing devices described herein by program code comprising program instructions that are executable by the device processing subsystem. Other implementations may also be used, however, such as firmware or even appropriately designed hardware configured to carry out the methods and flow diagrams or implement the structure block diagrams described in this patent document. Additionally, the methods, flow diagrams and structure block diagrams described in this patent document that describe particular methods and/or corresponding acts in support of steps and corresponding functions in support of disclosed software structures may also be implemented in software stored in a computer readable medium, and equivalents thereof. The software structures may comprise source code, object code, machine code, or any other stored data that is operable to cause a processing system to perform methods described herein.

Figure 9:
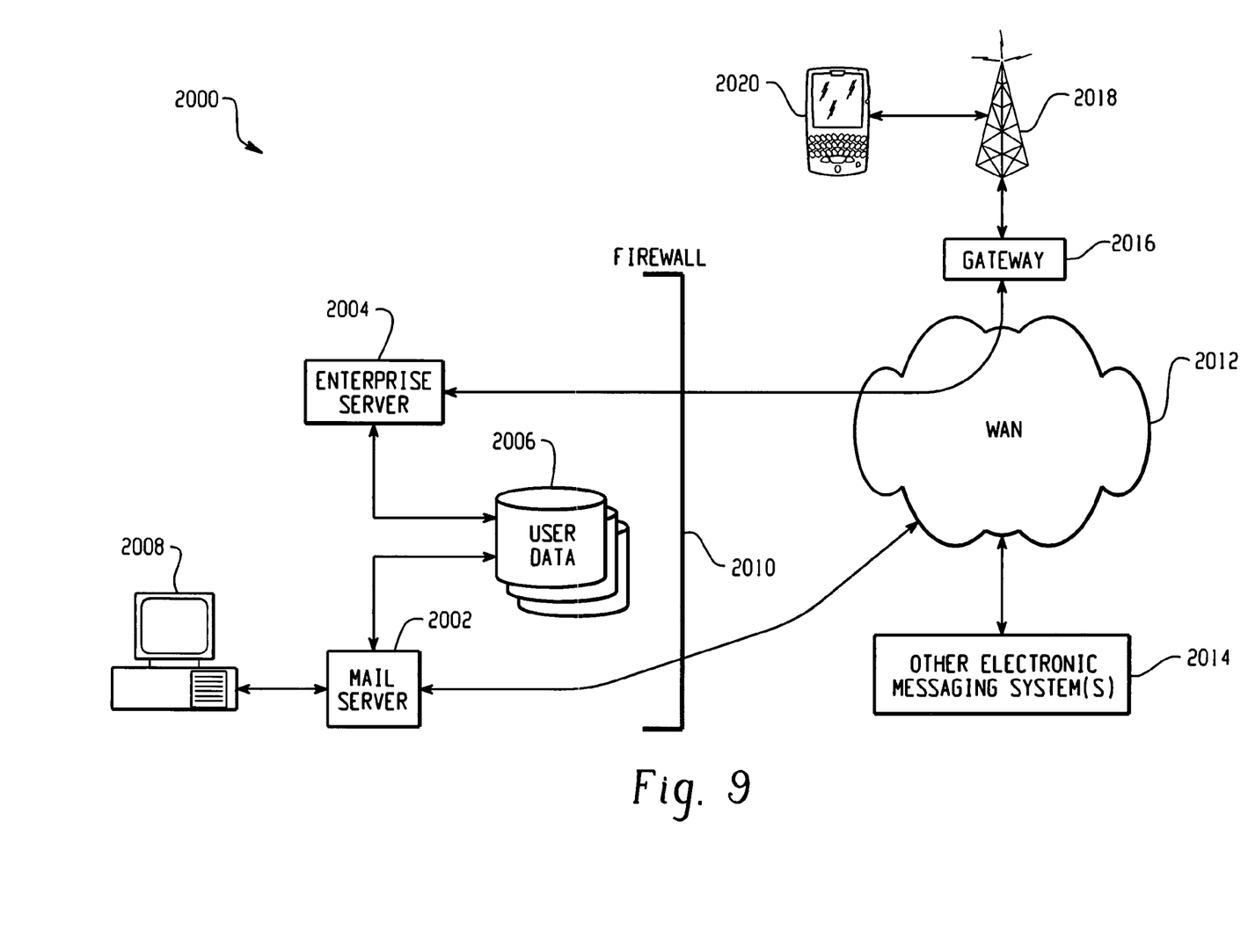
FIG. 9 is a block diagram of an example system for redirecting electronic messages to and from a mobile communication device.

FIG. 9 is a block diagram of an example system 2000 for redirecting electronic messages to and from a mobile communication device 2020. The system 2000 is an example operating environment for the systems and methods described herein. The example redirection system 2000 includes an enterprise server 2004, a mail server 2002, a storage medium 2006 for electronic messaging (e.g., e-mail) account data, and a wireless gateway 2016. Also illustrated are the mobile communication device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic message addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the mobile communication device 2020 and to place messages sent from the mobile communication device 2020 into the electronic message account 2006 for delivery by the mail server 2002. The enterprise server 2004 stores mobile device information, such as a wireless identification (e.g., a PIN), used to communicate with the mobile communication device 2020. The enterprise server 2004 may, for example, communicate with the mobile communication device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary mobile device information are sent over the WAN 2012 to the wireless gateway 2016. For example, the enterprise server 2004 may encapsulate a copy of the message into one or more data packets along with a wireless identification (e.g., a PIN) for the mobile communication device 2020, and transmit the data packet(s) to the wireless gateway 2016 over a direct TCP/IP level connection. The wireless gateway 2016 may then use the wireless identification and/or other mobile device information to transmit the data packets(s) containing the electronic message over the wireless network 2018 to the mobile communication device 2020.

Electronic messages sent from the mobile communication device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the mobile communication device 2020. For instance, an electronic message to be redirected to the mobile communication device 2020 may be encrypted and compressed by the enterprise server 2004, and the encrypted message may then be encapsulated into one or more data packets for delivery to the mobile communication device 2020. To maintain security, the electronic message may remain encrypted over the entire communication path 2016, 2018, 2012 from the enterprise server 2004 to the mobile communication device 2020. Similarly, electronic messages sent from the mobile communication device 2020 may be encrypted and compressed by the mobile communication device 2020 before being packetized and transmitted to the enterprise server 2004, and may remain encrypted over the entire communication path 2016, 2018, 2012 from the mobile communication device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

The communication manager may, for example, be implemented in the enterprise server 2004, or the gateway 2016, or in one or more mobile devices 2020. Alternatively, communication managers may be distributed throughout the system of FIG. 9.

Figure 10:
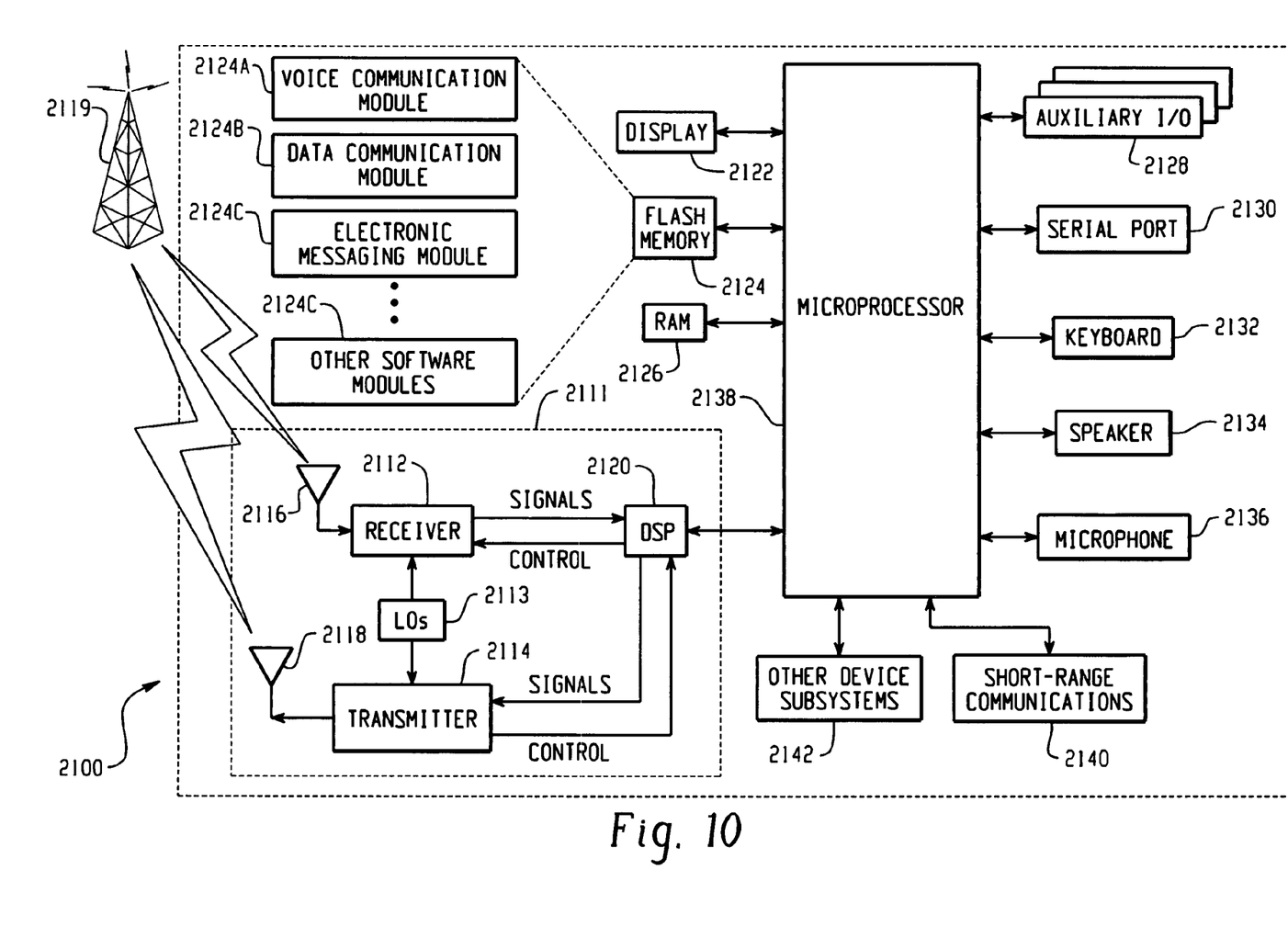
FIG. 10 is a block diagram illustrating an example mobile communication device.

FIG. 10 is a block diagram illustrating an example mobile communication device 2100. The systems and methods described herein may also be implemented in the example mobile device 2100. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description sets forth the best mode of the claimed invention, and describes the claimed invention to enable a person of ordinary skill in the art to make and use it, by presenting examples of the elements recited in the claims. The patentable scope of the invention is defined by the following claims.

What is claimed is:

1. A processor-implemented method for facilitating a communication over a plurality of transport mediums, comprising:

receiving communication data for a communication to be delivered to a communication device over a first transport medium;

determining if the communication device is presently operable to receive the communication over the first transport medium by checking the transport coverage of the first transport medium at the communication device;

if the communication device is not presently operable to receive the communication over the first transport medium, then:

determining which of the plurality of transport mediums over which the communication device is presently operable to receive the communication by checking the transport coverage of each of the plurality of transport mediums at the communication device; and selecting one of the plurality of transport mediums as a second transport medium for delivery of at least a subset of the communication to the communication device.

2. The method of claim 1, wherein the communication to be delivered to a communication device over a first transport medium comprises an e-mail communication.

3. The method of claim 2, wherein the subset of the communication comprises a short messaging service (SMS) message.

4. The method of claim 1, wherein the communication to be delivered to a communication device over a first transport medium comprises a short messaging service (SMS) message.

5. The method of claim 1, wherein selecting one of the plurality of transport mediums as a second transport medium for delivery of the communication to the communication device comprises:

accessing transport options data; and selecting one of the plurality of transport mediums as the second transport medium based on the transport options data.

6. The method of claim 1, further comprising converting the communication from a first transport medium format to a second transport medium format that corresponds to the second transport medium.

7. The method of claim 6, wherein the first transport medium comprises an e-mail transport medium and the second transport medium comprises a short messaging service (SMS) transport medium.

8. The method of claim 7, wherein converting the communication from a first transport medium format to a second transport medium format comprises generating SMS message data from e-mail message data.

9. The method of claim 1, further comprising delivering the communication over the first transport medium when the mobile device becomes presently operable to receive the communication over the first transport medium.

10. The method of claim 1, wherein the communication device is not presently operable to receive the communication over the first transport medium because a network associated with the first transport medium is down.

11. The method of claim 1, wherein the communication device is not presently operable to receive the communication over the first transport medium because the communication device is out of data coverage for the first transport medium.

12. The method of claim 1, wherein the transport coverage of one or more of the plurality of transport mediums is checked by determining if the communication device has secured a network resource associated with the one or more of the plurality of transport mediums.

13. The method of claim 1, wherein the transport coverage of one or more of the plurality of transport mediums is checked by examining data received from the communication device to determine if the data includes indicia of mobile device coverage.

14. A processor-implemented method for facilitating communication over a plurality of transport mediums, comprising:

receiving communication data for a communication to be delivered to a communication device over a first transport medium;

determining a present transport coverage at the communication device, wherein the present transport coverage indicates which of the plurality of transport mediums are locally available to the communication device;

if the present transport coverage does not include the first transport medium, then:

selecting a second transport medium over which the communication device is presently operable to receive communication data;

determining if the second transport medium is operable to deliver the communication;

if the second transport medium is operable to deliver the communication, then redirecting the communication over the second transport medium; and if the second transport medium is not operable to deliver the communication, then generating and transmitting alternate communication data over the second transport medium.

15. The method of claim 14, wherein selecting a second transport medium over which the communication device is presently operable to receive communication data comprises:

accessing transport options data; and selecting one of the plurality of transport mediums as the second transport medium based on the transport options data.

16. The method of claim 14, wherein the communication to be delivered to a communication device over a first transport medium comprises an e-mail communication.

17. The method of claim 16, wherein the alternate communication data comprises a short messaging service (SMS) message.

18. The method of claim 16, wherein the alternate communication data comprises a personal identification number (PIN) message.

19. The method of claim 14, wherein the communication to be delivered to a communication device over a first transport medium comprises a short messaging service (SMS) message.

20. The method of claim 14, further comprising delivering the communication over the first transport medium when the mobile device becomes presently operable to receive the communication over the first transport medium.

21. A system for facilitating a communication over a plurality of transport mediums, comprising:

an integrated transport delivery device comprising a processing subsystem, a memory subsystem, and a communication subsystem, the processing subsystem coupled to the memory subsystem and the communication subsystem, and operable to store and retrieve data in the memory subsystem, to execute instructions stored in the memory subsystem, and send and receive data over the communication subsystem over a plurality of transport mediums; and integrated transport delivery device program code comprising program instructions executable by the processing subsystem and stored in the memory subsystem and upon execution cause the integrated transport delivery device to be operable to:

receive communication data for a communication to be delivered to a communication device over a first transport medium;

determine if the communication device is presently operable to receive the communication over the first transport medium by checking the transport coverage of the first transport medium at the communication device; and if determining that the communication device is not presently operable to receive the communication over the first transport medium, then:

determine which of the plurality of transport mediums over which the communication device is presently operable to receive the communication by checking the transport coverage of the plurality of transport mediums at the communication device; and select one of the plurality of transport mediums as a second transport medium for delivery of at least a subset of the communication to the communication device.

22. The system of claim 21, wherein the communication to be delivered to a communication device over a first transport medium comprises an e-mail communication.

23. The system of claim 22, wherein the subset of the communication comprises a short messaging service (SMS) message.

24. The system of claim 21, wherein the integrated transport delivery device program code comprises further program instructions executable by the processing subsystem and stored in the memory subsystem and upon execution cause the integrated transport delivery device to be operable to:

access transport options data; and select one of the plurality of transport mediums as the second transport medium based on the transport options data.

25. The system of claim 21, wherein the integrated transport delivery device program code comprises further program instructions executable by the processing subsystem and stored in the memory subsystem and upon execution cause the integrated transport delivery device to be operable to convert a least a subset the communication from a first transport medium format to a second transport medium format that corresponds to the second transport medium.

26. The system of claim 21, wherein the integrated transport delivery device program code comprises further program instructions executable by the processing subsystem and stored in the memory subsystem and upon execution cause the integrated transport delivery device to deliver the communication over the first transport medium when the mobile device becomes presently operable to receive the communication over the first transport medium.

* * * * *

UNITED STATES PATENT AND TRADEMARK OFFICE
CERTIFICATE OF CORRECTION

PATENT NO. : 7,583,958 B2  Page 1 of 1
APPLICATION NO. : 10/982480
DATED : September 1, 2009
INVENTOR(S) : Coskun et al.

It is certified that error appears in the above-identified patent and that said Letters Patent is hereby corrected as shown below:

Column 16, line 15, claim 25 please replace "convert a least a subset the" with -- convert at least a subset of the --

Signed and Sealed this

Sixth Day of October, 2009

David J. Kappos
*Director of the United States Patent and Trademark Office*